United States Patent
Boukari

(10) Patent No.: US 9,884,297 B2
(45) Date of Patent: Feb. 6, 2018

(54) DEVICE FOR METERING A REAGENT BY DISSOLUTION IN A LIQUID FLOW

(71) Applicant: Prodose, Bessieres (FR)

(72) Inventor: Morou Boukari, Toulouse (FR)

(73) Assignee: PRODOSE, Bessieres (FR)

(*) Notice: Subject to any disclaimer, the term of this patent is extended or adjusted under 35 U.S.C. 154(b) by 568 days.

(21) Appl. No.: 14/376,854

(22) PCT Filed: Feb. 8, 2013

(86) PCT No.: PCT/FR2013/050272
§ 371 (c)(1),
(2) Date: Aug. 6, 2014

(87) PCT Pub. No.: WO2013/124567
PCT Pub. Date: Aug. 29, 2013

(65) Prior Publication Data
US 2015/0034542 A1  Feb. 5, 2015

(30) Foreign Application Priority Data

Feb. 21, 2012 (FR) ..................... 12 51558

(51) Int. Cl.
*B01F 1/00* (2006.01)
*C02F 1/68* (2006.01)

(52) U.S. Cl.
CPC .......... *B01F 1/0027* (2013.01); *B01F 1/0033* (2013.01); *C02F 1/688* (2013.01);
(Continued)

(58) Field of Classification Search
CPC .. C02F 1/68; C02F 1/687; C02F 1/688; C02F 2303/04; B01F 1/0027; B01F 1/0033;
(Continued)

(56) References Cited

U.S. PATENT DOCUMENTS 3,474,817 A    10/1969  Bates
3,495,948 A *   2/1970  Long .................... C02F 1/688
                                            239/310

(Continued)

FOREIGN PATENT DOCUMENTS

EP        1289890 A1      3/2003
WO    WO 0192164 A1 * 12/2001   ............ C02F 1/688

OTHER PUBLICATIONS

Simin Baharlou, Preliminary International Report on Patentability, PCT/FR2013/050272, International Bureau of the World Intellectual Property Organization, dated Aug. 26, 2014 (English translation).

*Primary Examiner* — Lucas Stelling
(74) *Attorney, Agent, or Firm* — Paul & Paul

(57) ABSTRACT

The invention relates to a metering device (D) for metering a reagent by dissolution in a liquid flow, characterized in that it comprises a plurality of parts: —a fixed base (200) grouping together said enclosure and a liquid inlet, means for bringing the liquid into contact with the reagent roller (G) and liquid outlet means, —one or more cartridges (300) forming a separate detachable volume grouping together said reagent magazine, means for forming at least one liquid jet directed substantially radially towards the roller (G) to be dissolved, and means for supporting the roller (G), said cartridge (300) coming to be associated with said base (200) which is preformed with at least one area for receiving said cartridge (300) for the purpose of dissolving the reagent.

8 Claims, 5 Drawing Sheets

(52) U.S. Cl.
CPC ............... *B01F 2001/0055* (2013.01); *B01F 2001/0061* (2013.01); *C02F 2303/04* (2013.01)

(58) Field of Classification Search
CPC ...... B01F 2001/0055; B01F 2001/0061; B01F 3/12; B01F 2003/125
See application file for complete search history.

(56) References Cited

U.S. PATENT DOCUMENTS

| | | | | |
|---|---|---|---|---|
| 4,842,729 | A | * | 6/1989 | Buchan ................... C02F 1/688 137/268 |
| 4,917,868 | A | | 4/1990 | Alexander |
| 5,089,127 | A | | 2/1992 | Junker |
| 5,181,533 | A | | 1/1993 | Kooi |
| 6,298,871 | B1 | * | 10/2001 | Pickens ................. B01F 1/0027 137/268 |
| 2011/0056891 | A1 | * | 3/2011 | Greene, III ............. C02F 1/688 210/749 |

* cited by examiner

DEVICE FOR METERING A REAGENT BY DISSOLUTION IN A LIQUID FLOW

FIELD OF APPLICATION OF THE INVENTION

This invention relates to the field of devices for metering a reagent by dissolution in a liquid flow and in particular for adaptations making it possible to improve the operation and to facilitate the maintenance thereof.

DESCRIPTION OF PRIOR ART

The metering of a reagent by dissolution in a liquid flow is now commonly used in particular to disinfect the water, with the reagent then consisting in a chlorinated product.

For example, document EP 1289890 describes a metering device by dissolution of a reagent in a liquid flow, comprising:

a reagent magazine, containing at least one reagent tablet to be dissolved, and an enclosure surrounding at least the lower portion of the reagent magazine and comprising a liquid inlet, means for bringing the liquid into contact with the reagent tablet and liquid outlet means. This device also comprises means for forming at least one liquid jet directed substantially radially towards the tablet to be dissolved and means for supporting the tablet in a position that exposes at least the base of this tablet to the liquid jet.

The effect of the liquid jet or jets on the base of the reagent tablet is according to the kinetic energy of the liquid jet or jets which is itself according to the supply pressure of the liquid in the metering device. As such, contrary to the metering devices preceding the one described in the document mentioned hereinabove, the dissolution of the reagent in the liquid is then according to this supply pressure and automatically adapts to the variations of the latter, in such a way that the concentration in reagent in the liquid can remain uniform over time, even if the pressure of the liquid varies.

This document nevertheless does not describe the dispositions linked to the maintenance of this device or the dispositions able to supplement such a device.

As for example, it is not described how the operations for refilling the magazine are carried out or how said enclosure is able to be integrated inside a more general treatment device that has functional modules for treating a liquid.

DESCRIPTION OF THE INVENTION

With this in mind, the applicant has conducted research aimed at proposing a new device that implements the principles described in document EP 1289890 by proposing technical solutions as to the reloading of the tablets.

Another object of the invention is to propose a device for treating liquid that integrates the metering device of the invention.

This research resulted in the design of a metering device by dissolution of a reagent in a liquid flow, comprising:

a reagent magazine, containing at least one reagent tablet to be dissolved, an enclosure surrounding at least one end of the reagent magazine, a liquid inlet, means for bringing the liquid into contact with the reagent tablet and liquid outlet means, means for forming at least one liquid jet directed substantially radially towards the tablet to be dissolved and means for supporting the tablet in a position that exposes at least the base of this tablet to the liquid jet.

According to the invention, this device is remarkable in that it comprises a plurality of parts:

a fixed base grouping together said enclosure and a liquid inlet, means for bringing the liquid into contact with the reagent tablet and liquid outlet means, one or several cartridges forming a separate detachable volume grouping together said reagent magazine, means for forming at least one liquid jet directed substantially radially towards the tablet to be dissolved and means for supporting the tablet, said cartridge coming to be associated with said base which is preformed with at least one area for receiving said cartridge for the purposes of dissolving of the reagent.

The conditioning by cartridge provides many advantages of which those described hereinafter.

It makes it possible to have a means for managing the consumption of the device. As such, the cartridge can be associated with the base until the complete dissolution of the reagent then is replaced.

It authorizes the use of different tablets and with a different number according to the application.

It makes it possible to propose single-use cartridges which contain pre-dosed products according to the volume of liquid to be treated.

The principle of an operation with single-used cartridges is particularly adapted to the treatment of liquid in that it avoids for the user of the device, contact with the product or products to be dosed/reloaded.

Said cartridge adopts a substantially cylindrical body that is preformed exteriorly with a threaded portion that engages in a threaded hollow cylinder preformed in the base.

Said cartridge as well as its connection with the receiving enclosure were subjected to research by the applicant in order to propose several solutions for manufacturing and sealing. As such, according to a particularly advantageous characteristic, the cartridge a underwent a study making it possible to decrease the number of parts that constitute it. Such a configuration has advantages in terms of manufacturing cost, mounting and the quality of sealing.

With regards to the seal of the screwed connection between the base and the cartridges, a first solution consists in proposing the application of a strip of teflon that is inserted between the threaded portions male of the cartridge and female of the base. Another solution consists in preforming the hollow cylinder arranged in the base with a groove for receiving an O-ring with which cooperates a cylindrical surface extending the threaded sleeve exteriorly of the cartridge. Such a solution is particularly adapted to a use with single-use cartridges in that it makes it possible to guarantee the seal despite the succession of cartridge installation and de-installation operations.

According to a particularly advantageous characteristic, the cylindrical surface is substantially tapered in order to facilitate the insertion of the cartridge and in order to propose a progressive pressurizing of the O-ring as the cartridge is screwed.

In order to facilitate the management of the replacing of the cartridges, the wall or walls separating the tablets from the exterior are transparent.

The device of the invention is furthermore particularly advantageous in that it comprises a frame whereon is fixed said base with which communicates a duct coming from a filtration module also fixed to said frame.

With the fundamental concepts of the invention having been exposed hereinabove in their most elementary form, other details and characteristics shall appear more clearly when reading the following description and with regards to the annexed drawings, given by way of a non-restricted example, an embodiment of a device in accordance with the invention.

DESCRIPTION OF PREFERRED EMBODIMENTS

Figure 1:
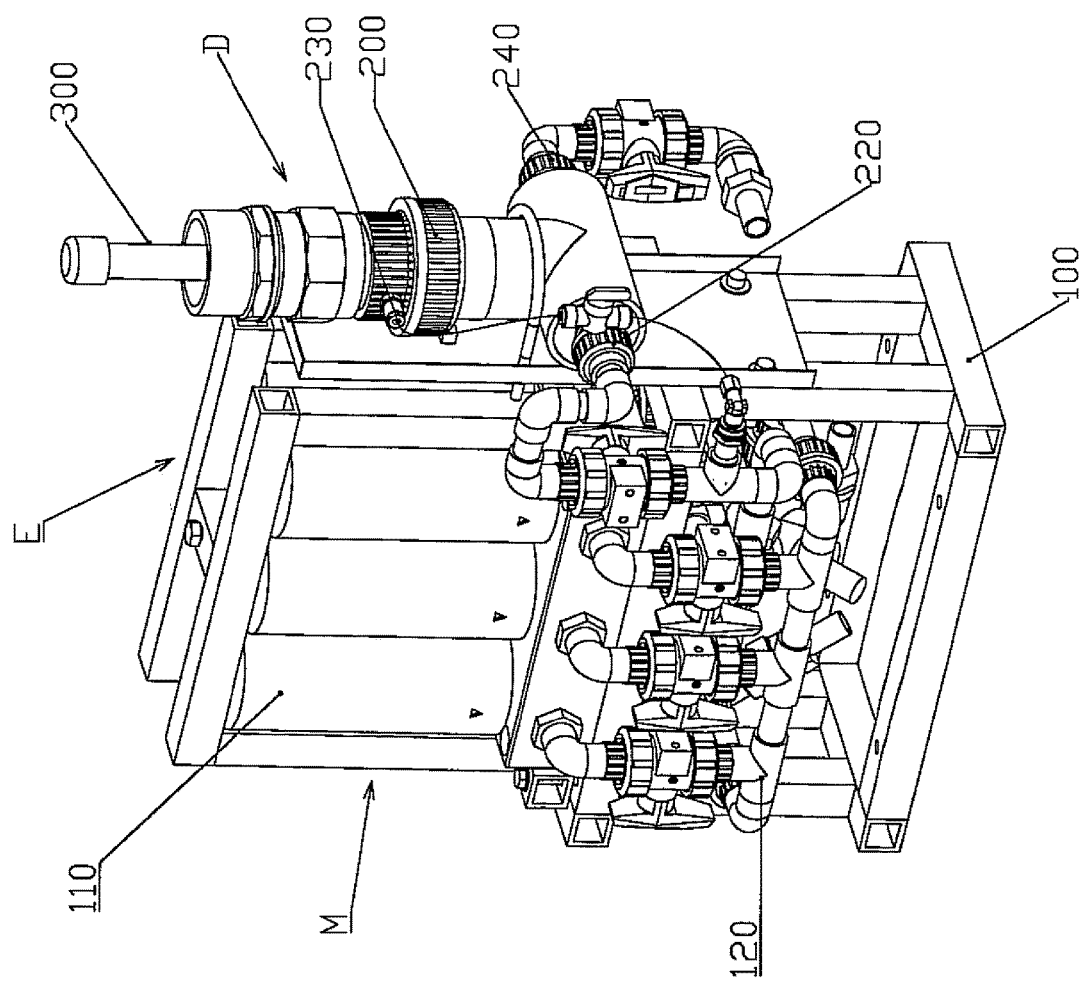
FIG. 1 is a diagrammatical drawing of a perspective view of an embodiment of a device in accordance with the invention.
Figure 2:
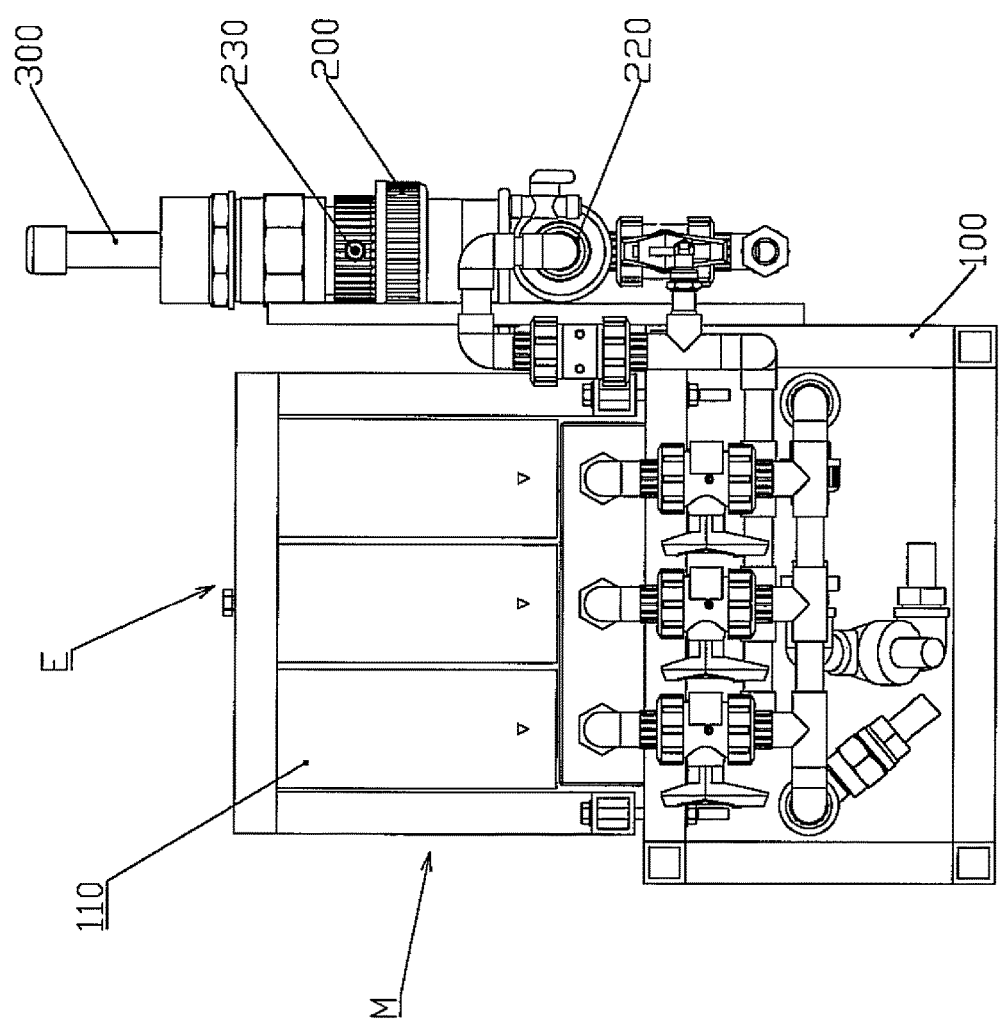
FIG. 2 is a side view of the device of FIG. 1.

Such as shown in the drawings of FIGS. 1 and 2, the metering device referenced as D is part of a set referenced as E for the treatment of water for example the drinking water circuit of an aircraft.

This set E comprises, fixed to the same frame 100, an anti-bacterial filtration module M comprising a plurality of filters 110 connected to water inlet and outlet ducts 120. The latter come together in order to propose a main flow as well as a derivative flow of filtered water, which are directed towards the metering device D.

This metering device D by dissolution of a reagent in a liquid flow, comprises a base 200 passed through by said flow and receiving a reagent magazine 300 that has the form of a cartridge.

Figure 3:
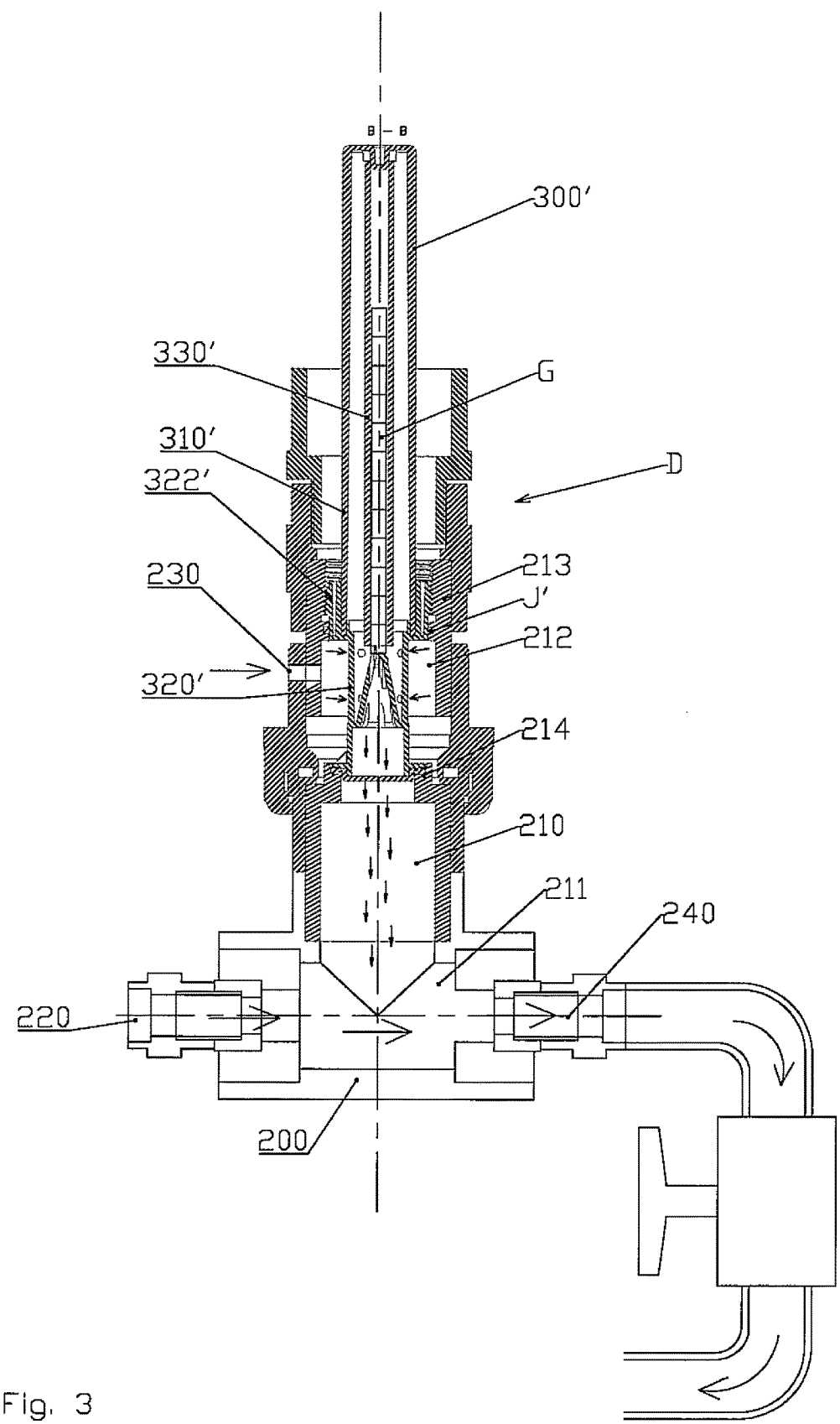
FIG. 3 is a side cross-section view of the base receiving a cartridge.

In accordance with the invention and as shown in the drawing of FIG. 3, the fixed base 200 forms a hollow volume 210, here vertical, with which communicate a first liquid inlet 220 receiving the main flow and a second liquid inlet 230 receiving the derivative flow.

As shown, once the cartridge 300 is installed, the device D of which the base 200 receives the bottom portion of the cartridge 300 has its hollow volume 210 divided into two cavities:

a lower cavity 211 wherein opens the liquid inlet 220, an upper cavity 212 wherein opens the liquid inlet 230 and formed by the inside surface of the base and by the outside surface of the bottom end of the cartridge 300 which comes to partition the hollow volume 210 by coming to bear against a shoulder provided for this purpose.

In accordance with the principles of the invention, the bottom portion of the cartridge 300 is pierced on the one hand, with holes that allow the liquid entering the upper cavity 212 to come into contact with the reagent tablet G according to a radial spacing and on the other hand, with an open bottom end in order to allow the liquid treated by the reagent to mix with the main flow passing in the lower cavity 211 which opens onto an outlet orifice 240.

Figure 4:
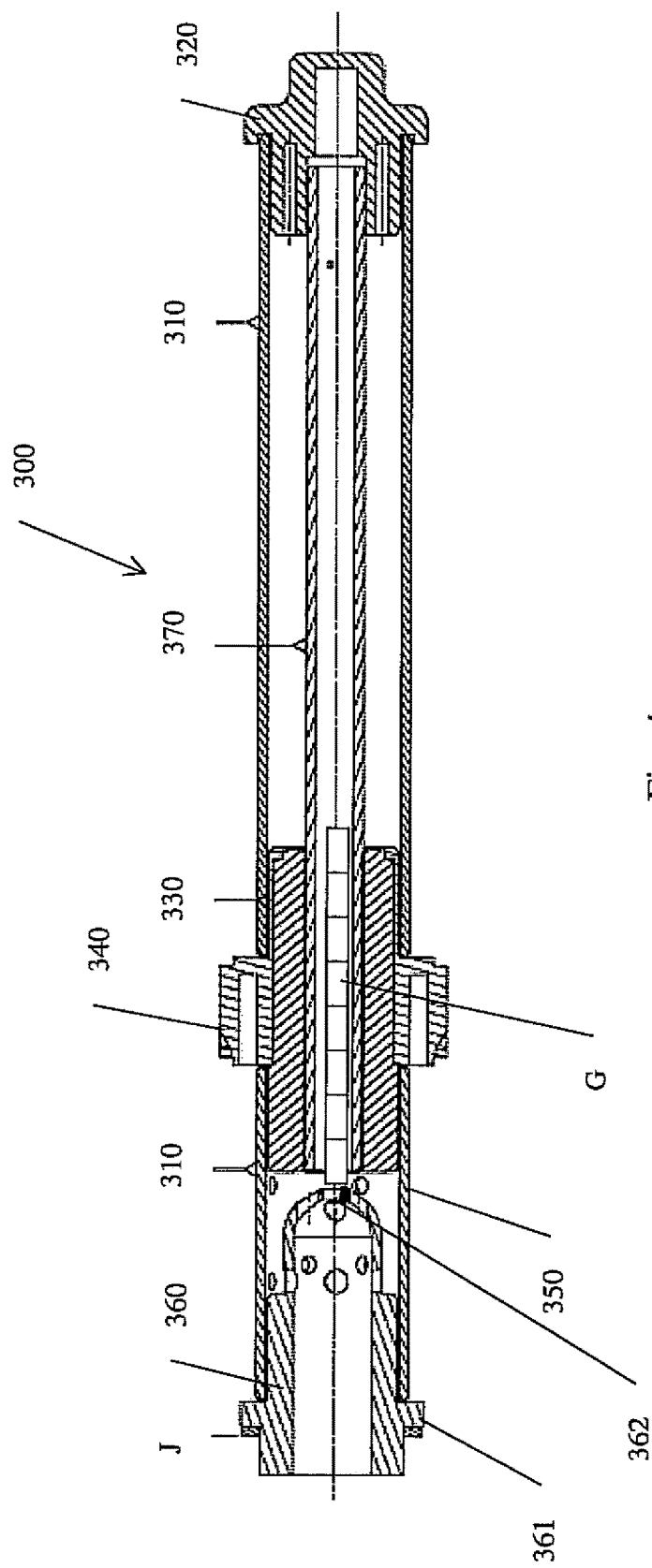
FIG. 4 is a side cross-section view of a first embodiment of a cartridge.

As shown in the drawing of FIG. 4, the cartridge 300 adopts a cylindrical configuration formed with a succession of tubular or semi-tubular volumes making it possible to propose:

a volume for storing the tablets G that allows for their axial movement downwards, a support surface for the latter and means for forming a liquid jet directed substantially radially towards the tablet G bearing against said surface.

More precisely, according to the non-restricted embodiment shown, the cartridge 300 comprises a first outside hollow cylinder 310 closed at an end by a plug 320 and press fitted at a second end on a first end of a tubular sleeve 330, which receives an exteriorly threaded crown 340 with a diameter greater than the outside cylinder 310. This threaded crown 340 makes it possible to screw in the base 200 in a threading 213 provided for this purpose, the cartridge 300. A strip of sealing film of the teflon type provides the seal of this connection.

Onto the second end of the tubular sleeve is press fitted a second outside hollow cylinder 350 that receives via press fitting on its second end, an end sleeve 360. This end sleeve exteriorly forms a shoulder 361 which, on one side bears against said second end of the second outside cylinder 350 and on another side bears against by the intermediary of a seal J, with a flange 214 provided for this purpose in the hollow core of the hollowed-out volume 200 of the base 200. This end sleeve furthermore interiorly forms a support point for the tablets G stored coaxially in an inside cylinder 370. This support point constitutes a perforated surface of orifice 363 allowing for the flow of the dissolved tablet in the lower portion of the base 200. As shown, the second outside cylinder 350 is preformed with orifices that make it possible to create a radial liquid jet in relation to the tablets G bearing against the support point 362. As shown, a first end of said inside cylinder cooperates with the plug 320 and a second end cooperates with the hollow core of said sleeve 330.

Said cartridge is on the one hand, designed to allow for the dissolution of the tablet but also to allow for the passage of the liquid in the hollow core of the inside cylinder in order to authorize the sliding of the tablets G in said hollow core.

Figure 5:
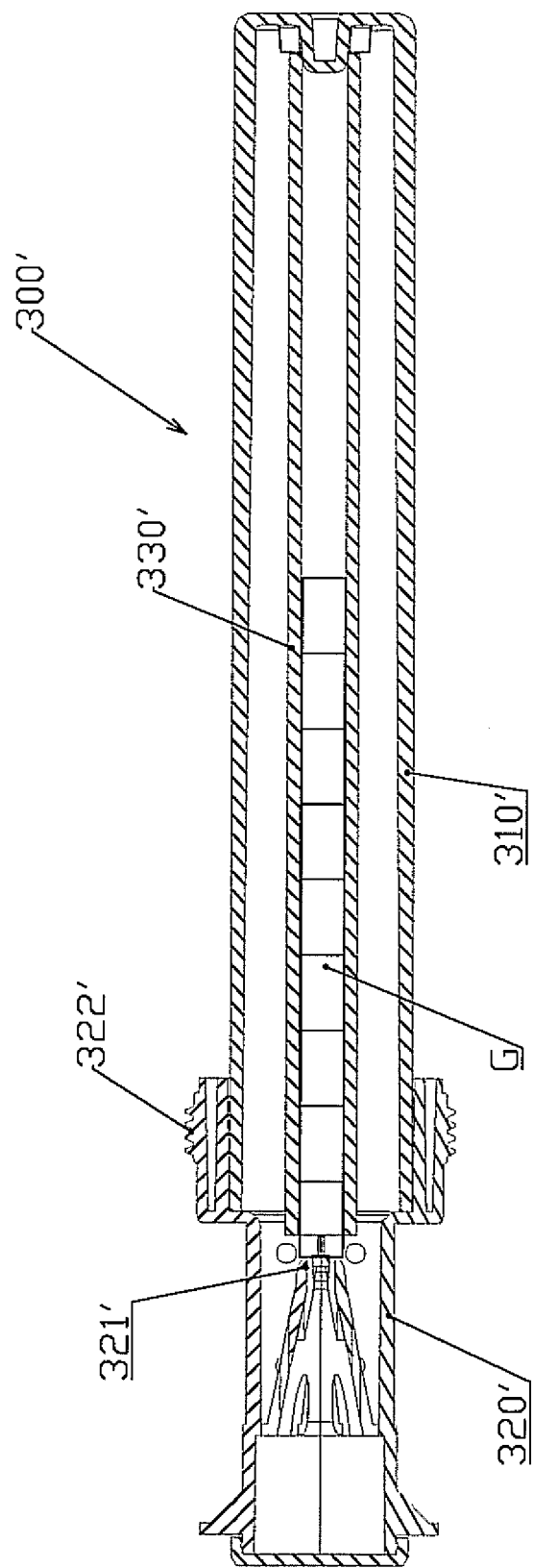
FIG. 5 is a side view of a second embodiment of the cartridge corresponding to that shown in FIG. 3.

In order to reduce the number of parts that comprise this cartridge as well as to improve the seal of the parts among themselves and of the cartridges with the base, another embodiment of a cartridge referenced as 300' is proposed and shown in the drawing of FIG. 5.

According to this embodiment, the cartridge 300' includes the same volumes and most of the functional surfaces of the cartridge 300 but with a manufacture simplified by a reduced number of constitutive parts and by an optimized seal in particular in its connection with the base.

As such, according to the embodiment shown, the cartridge 300' comprises a semi-tubular cylindrical body 310' closed at an end and receiving at its other end, an end sleeve 320' preformed with an internal bearing surface 321' and a threaded outside sleeve 322'. Said bearing surface offers a support to the tablets G exiting from the end of an inside cylinder 330' of which the other end cooperates with the closed bottom of the cylindrical body 310'.

By reducing the number of parts, the possibilities for leakage and the number of operations concerning mounting are reduced. According to a preferred embodiment, these parts are made of plastic and are assembled by gluing or by welding.

In addition, the threaded connection is retained but is associated with a seal via O-ring J' which, housed in a groove made in the threaded sleeve of the base receiving the threaded sleeve of the cartridge 300' comes to bear against with a substantially cylindrical surface 323' located downstream of the threading 322'.

According to a preferred embodiment, said cylindrical surface whereon said O-ring J' presses is slightly tapered in order to facilitate its insertion and render the connection more sealed as the cartridge is screwed 300'.

According to a particularly advantageous embodiment, the walls of the cylindrical bodies surrounding the tablets are transparent as such making it possible to verify the filling and the consumption thereof.

It is understood that the device, which has just been described and shown hereinabove, was described and shown for the purposes of a disclosure rather than a limitation. Of course, various arrangements, modifications and improvements can be made to the example hereinabove, without however leaving the scope of the invention.

The invention claimed is:

1. A metering device (D) by dissolution of a reagent in a liquid flow, comprising:
    a reagent magazine, containing at least one reagent tablet (G) to be dissolved,
    an upper cavity surrounding at least one end of the reagent magazine,
    a first liquid inlet to provide liquid to the upper cavity,
    means for bringing the liquid into contact with the reagent tablet positioned in the upper cavity, the means for bringing the liquid in contact with the reagent tablet comprising means for forming at least one liquid jet directed substantially radially towards the tablet (G) to be dissolved and means for supporting the tablet (G) in a position that exposes at least the base of this tablet (G) to the liquid jet,
    a lower cavity, a second liquid inlet, and a liquid outlet, the lower cavity being in fluid communication with the upper cavity, the second liquid inlet, and with the liquid outlet;
    characterized in that the device includes a fixed base and at least one cartridge detachable from the base;
    the fixed base (200) including the first liquid inlet, the second liquid inlet, the lower cavity and the liquid outlet the base being adapted to receive the at least one detachable cartridge,
    the at least one detachable cartridge having a wall, the at least one detachable cartridge including the reagent magazine, the means for forming at least one liquid jet directed substantially radially towards the tablet (G) to be dissolved and the means for supporting the tablet (G),
    said cartridge adopting a substantially cylindrical body exteriorly preformed with a threaded portion that engages in a threaded hollow cylinder (213) preformed in said base (200).

2. The device (D) according to claim 1, characterized by the fact that a strip of sealing film is inserted between the threaded portion and the threaded hollow cylinder (213).

3. The device (D) according to claim 1, characterized by the fact that the hollow cylinder (213) arranged in the base is preformed with a groove for receiving an O-ring with which cooperates a cylindrical surface.

4. The device (D) according to claim 3, characterized by the fact that said cylindrical surface is tapered in order to facilitate the insertion of the cartridge and in order to provide a progressive pressurizing of the O-ring as the cartridge is screwed.

5. The device (D) according to claim 1, characterized by the fact that the device comprises a frame (100) whereon is fixed said base (200) with which communicates a duct coming from a filtration module (M) also fixed to said frame (100).

6. The device (D) according to claim 1, characterized by the fact that a wall separating the tablets (G) from the exterior is transparent.

7. The device (D) according to claim 1, characterized by the fact that said cartridge (300) comprises a first outside hollow cylinder (310) closed at an end by a plug (320) and press fitted at a second end on a first end of a tubular sleeve (330), which receives an exteriorly threaded crown (340) that comprises said threaded portion, said threaded crown having a diameter greater than the outside cylinder (310), said threaded crown (340) configured to screw said cartridge (300) into the base (200) with said threaded hollow cylinder (213), a second hollow outside cylinder (350) being press fitted onto the second end of the tubular sleeve (330) and receives via press fitting on its second end, an end sleeve (360).

8. The device (D) according to claim 1 characterized by the fact that said cartridge (300') comprises a semi-tubular cylindrical body (310') closed at an end and receiving at its other end, an end sleeve (320') preformed with an internal bearing surface (321') and of a threaded outside sleeve (322') that comprises the threaded portion, said internal bearing surface offering a support to the tablets (G) exiting from the end of an inside cylinder (330') of which the other end cooperates with the closed bottom of the cylindrical body (310').

* * * * *